US010971752B2

(12) United States Patent
Woehrle et al.

(10) Patent No.: US 10,971,752 B2
(45) Date of Patent: Apr. 6, 2021

(54) COMPOSITE CATHODE AND LITHIUM-ION BATTERY COMPRISING SAME, AND METHOD FOR PRODUCING SAID COMPOSITE CATHODE

(71) Applicant: Bayerische Motoren Werke Aktiengesellschaft, Munich (DE)

(72) Inventors: Thomas Woehrle, Munich (DE); Saskia Lupart, Munich (DE); Nikolaos Tsiouvaras, Munich (DE); Hideki Ogihara, Haimhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 153 days.

(21) Appl. No.: 15/625,250

(22) Filed: Jun. 16, 2017

(65) Prior Publication Data

US 2017/0288260 A1 Oct. 5, 2017

Related U.S. Application Data

(63) Continuation of application No. PCT/EP2015/080143, filed on Dec. 17, 2015.

(30) Foreign Application Priority Data

Dec. 18, 2014 (DE) ...................... 10 2014 226 396.4

(51) Int. Cl.
*H01M 10/0525* (2010.01)
*H01M 10/0566* (2010.01)
*H01M 4/62* (2006.01)
*H01M 4/505* (2010.01)
*H01M 4/525* (2010.01)
*H01M 4/02* (2006.01)

(52) U.S. Cl.
CPC ....... *H01M 10/0525* (2013.01); *H01M 4/505* (2013.01); *H01M 4/525* (2013.01); *H01M 4/62* (2013.01); *H01M 4/622* (2013.01); *H01M 4/624* (2013.01); *H01M 10/0566* (2013.01); *H01M 2004/028* (2013.01)

(58) Field of Classification Search
CPC .. H01M 10/052; H01M 4/62; H01M 10/0525; H01M 4/13; H01M 2004/021; H01M 10/056; H01M 10/0566; H01M 4/624; H01M 8/1016
See application file for complete search history.

(56) References Cited

U.S. PATENT DOCUMENTS

| | | | | |
|---|---|---|---|---|
| 4,008,523 | A | 2/1977 | Von Voros | |
| 5,872,358 | A | 2/1999 | Todokoro et al. | |
| 6,451,480 | B1 * | 9/2002 | Gustafson | H01M 4/621 429/217 |
| 6,677,082 | B2 | 1/2004 | Thackeray et al. | |
| 6,680,143 | B2 | 1/2004 | Thackeray et al. | |
| 7,205,072 | B2 | 4/2007 | Kang et al. | |
| 2004/0058246 | A1 * | 3/2004 | Choi | H01M 4/624 429/232 |
| 2007/0259271 | A1 * | 11/2007 | Nanno | H01M 2/0267 429/318 |
| 2008/0176142 | A1 * | 7/2008 | Inagaki | B60L 50/20 429/330 |
| 2008/0213671 | A1 * | 9/2008 | Kogetsu | H01M 10/0525 429/246 |
| 2008/0241670 | A1 * | 10/2008 | Kim | H01M 10/0525 429/163 |
| 2008/0268348 | A1 | 10/2008 | Katoh | |
| 2009/0305135 | A1 * | 12/2009 | Shi | H01M 4/13 429/217 |
| 2010/0176337 | A1 * | 7/2010 | Zhamu | H01M 4/1395 252/182.1 |
| 2011/0045355 | A1 | 2/2011 | Ichikawa | |
| 2011/0223487 | A1 * | 9/2011 | Johnson | H01M 4/0471 429/319 |
| 2011/0300432 | A1 * | 12/2011 | Snyder | H01M 4/485 429/149 |
| 2012/0034528 | A1 * | 2/2012 | Wendman | H01M 12/005 429/300 |
| 2013/0089796 | A1 * | 4/2013 | Sun | H01M 12/06 429/406 |

(Continued)

FOREIGN PATENT DOCUMENTS

EP 1 723 080 B1 6/2014
EP 2 586 083 B1 7/2014

(Continued)

OTHER PUBLICATIONS

Xu et al., "Recent Progress in Cathode Materials Research for Advanced Lithium Ion Batteries", Materials Science and Engineering R 73, 2012, pp. 51-65.
Zhang, "A Review of the Electrochemical Performance of Alloy Anodes for Lithium-Ion Batteries", Journal of Power Sources, 196, 2011, pp. 13-24.
Knauth, "Inorganic Solid Li Ion Conductors: An Overview", Solid State Ionics 180, 2009, pp. 911-916.
Cao et al., "Recent Advances in Inorganic Solid Electrolytes for Lithium Batteries", Frontiers in Energy Research, 2014, vol. 2, Article 25, pp. 1-10.

(Continued)

*Primary Examiner* — Imran Akram
(74) *Attorney, Agent, or Firm* — Crowell & Moring LLP

(57) ABSTRACT

A composite cathode is provided which includes a collector, an active cathode material, a binder, a solid inorganic lithium-ion conductor and a liquid electrolyte. The solid inorganic lithium ion conductor is present in the composite cathode in a higher volume and weight proportion than the liquid electrolyte. A method for forming the composite cathode is also provided, and a lithium ion battery is provided which includes a composite cathode having a collector, an active cathode material, a binder, a solid inorganic lithium ion conductor and a liquid electrolyte.

14 Claims, No Drawings

(56) References Cited

U.S. PATENT DOCUMENTS

| | | | |
|---|---|---|---|
| 2013/0273407 A1* | 10/2013 | Kylyvnyk | H01M 2/1673 429/144 |
| 2014/0011100 A1 | 1/2014 | Lee et al. | |
| 2014/0170480 A1* | 6/2014 | Oladeji | H01M 4/74 429/199 |
| 2014/0199583 A1* | 7/2014 | Kondo | H01M 4/136 429/163 |
| 2014/0220428 A1* | 8/2014 | Zinck | H01M 10/05 429/200 |
| 2015/0194674 A1* | 7/2015 | Hardman | H01M 4/623 429/231.8 |
| 2016/0308243 A1* | 10/2016 | Herle | H01M 4/134 |

FOREIGN PATENT DOCUMENTS

| | | |
|---|---|---|
| JP | 2008-117543 A | 5/2008 |
| WO | WO 2014/064513 A1 | 5/2014 |

OTHER PUBLICATIONS

Weppner et al., "Determination of the Kinetic Parameters of Mixed-Conducting Electrodes and Application to the System $Li_3Sb$", J. Electrochem. Soc., vol. 24, No. 10, 1977, pp. 1569-1578.

Doughty et al., "FreedomCAR Electrical Energy Storage System Abuse Test Manual for Electric and Hybrid Electric Vehicle Applications", Sandia Report, SAND2005-3123, Unlimited Release Printed Aug. 2006, pp. 1-47.

International Search Report (PCT/ISA/210) issued in PCT Application No. PCT/EP2015/080143 dated Feb. 8, 2016 with English translation (five pages).

German-language Written Opinion (PCT/ISA/237) issued in PCT Application No. PCT/EP2015/080143 dated Feb. 8, 2016 (five pages).

German Search Report issued in counterpart German Application No. 10 2014 226 396.4 dated Oct. 23, 2015 with partial English translation (14 pages).

English-language translation of Chinese Office Action issued in counterpart Chinese Application No. 201580066678.2 dated Jan. 31, 2019 (10 pages).

* cited by examiner

COMPOSITE CATHODE AND LITHIUM-ION BATTERY COMPRISING SAME, AND METHOD FOR PRODUCING SAID COMPOSITE CATHODE

CROSS REFERENCE TO RELATED APPLICATIONS

This application is a continuation of PCT International Application No. PCT/EP2015/080143, filed Dec. 17, 2015, which claims priority under 35 U.S.C. § 119 from German Patent Application No. 10 2014 226 396.4, filed Dec. 18, 2014, the entire disclosures of which are herein expressly incorporated by reference.

BACKGROUND AND SUMMARY OF THE INVENTION

The present invention relates to a composite cathode. The present invention also relates to a lithium-ion battery having such composite cathode, and a method for producing such composite cathode.

As used herein, the terms "lithium-ion battery", "rechargeable lithium-ion battery", and "secondary lithium-ion battery" are used synonymously. These terms also encompass the terms "lithium battery", "lithium-ion accumulator", and "lithium-ion cell", and also all lithium or alloy batteries, including in particular Li-sulfur or alloy systems. Therefore, the term "lithium-ion battery" is used as a collective term for the aforementioned terms which are customary known in the art. It refers to both rechargeable batteries (secondary batteries) and non-chargeable batteries (primary batteries). In particular, as used herein, a "battery" within the meaning of the present invention also encompasses an individual or single "electrochemical cell".

Generally, as known in the art, the mode of action of a lithium-ion battery can be described as follows: the electrical energy is stored in lithium ions (at the negative electrode) and transition-metal oxides (at the positive electrode) in a chemical process with a change of material. Here, the lithium in the ionized form ($Li^+$) can migrate back and forth between the two electrodes through an electrolyte, which contains usually $LiPF_6$ as the conducting salt. In contrast to the lithium ions, the transition-metal ions present at the cathode are stationary.

This flow of lithium ions is necessary in order to compensate the external flow of electric current during charging and discharging, so that the electrodes themselves remain electrically neutral. During discharging, the effective lithium atoms (or the negative active material containing the lithium ions) at the negative electrode each release an electron, which flows by the external current circuit (load) to the positive electrode. At the same time, the same number of lithium ions migrates through the electrolyte from the negative electrode to the positive electrode. At the positive electrode, however, the lithium ions do not take up the electron again, but instead the transition-metal ions present there take up the electrons. Depending on the type of battery, these ions may be cobalt, nickel, manganese or iron ions, etc. The lithium thus continues to be in ionized form ($Li^+$) at the positive electrode in the discharged state of the cell.

Lithium-ion batteries are protected with gastight sealing, and so in regular operations none of the ingredients can emerge or enter. If the casing is damaged mechanically, as it may occur for example, in the event of an accident involving an electric motor vehicle, contents may emerge in vapor, gas or liquid form. Emerging in gas form, primarily, are vaporized electrolyte (an explosion risk) and electrolyte decomposition products such as methane, ethane, hydrogen, propane and butane, and aldehydes. Emerging in liquid form, the liquid electrolyte consisting of solvents and conducting salt. The solvents are generally flammable and are highly irritant. In contact with moisture, the conducting salt $LiPF_6$ can form hydrogen fluoride (HF) which is highly toxic and can be an irritant to the respiratory tract.

It is an object of the present invention to provide a lithium-ion battery with enhanced safety.

This and other objects of the invention are achieved by means of a composite cathode in accordance with one or more aspects of the disclosure.

The following definitions apply, where applicable, to all aspects of the disclosure:

Lithium-Ion Battery

As used herein, the term "lithium-ion battery" has the meaning as defined above. In particular, the term also includes an individual or single "electrochemical cell." Preferably, in a "battery", two or more electrochemical cells of this kind are connected, either in series (that is, one after another) or in parallel.

Electrodes

The electrochemical cell of the invention has at least two electrodes, i.e., a positive electrode (cathode) and a negative electrode (anode).

These two electrodes each have at least one active material. This material is capable of accepting or releasing lithium ions and at the same time takes up or releases electrons.

As used herein, the term "positive electrode" refers to the electrode which when the battery is connected to a load, such as to an electric motor, is capable of accepting electrons. In this nomenclature, it represents the cathode.

As used herein, term "negative electrode" refers to the electrode which in operation is capable of releasing electrons. In this nomenclature, it represents the anode.

The electrodes include inorganic material or inorganic compounds or substances which can be used for or in or on an electrode or as an electrode. Under the operating conditions of the lithium-ion battery, on the basis of their chemical nature, these compounds or substances can take up (intercalate) lithium ions or metallic lithium and also release them. In the present description, a material of this kind is referred to as an "active cathode material" or "active anode material", respectively, or, generally, as "active material" or "active electrode material." For use in an electrochemical cell or battery, this active material is preferably applied to a support, preferably to a metallic support, preferably using aluminum for the cathode and copper for the anode, respectively. This support is also referred to as a "collector" or a "current collector" or a "collector foil."

Cathode (The Positive Electrode)

As for selecting the active material for the positive electrode (also referred to as the active cathode material), it is possible to use any active materials which are known in the art. These include, for example, $LiCoO_2$ (LCO), lithium nickel cobalt manganese oxide (NCM), lithium nickel cobalt aluminum oxide (NCA), high-energy NCM (HE-NCM), lithium-iron phosphate, or Li-manganese spinel ($LiMn_2O_4$). According to one aspect of the invention, any suitable active material known in the art can be used for the cathode (the positive electrode).

In one preferred embodiment, the active cathode material may be a material selected from the group consisting of a lithium transition-metal oxide (also referred to as the lithium metal oxide), layered oxides, spinels, olivine compounds, silicate compounds, and mixtures thereof. Such active cathode materials are described for example in Bo Xu et al. "Recent Progress in Cathode Materials Research for Advanced Lithium Ion Batteries", *Materials Science and Engineering*, R 73 (2012) 51-65. Preferably, the active cathode material is HE-NCM. Layered oxides and HE-NCM are also described in U.S. Pat. Nos. 6,677,082, 6,680,143 and 7,205,072 of the Argonne National Laboratory.

Examples of olivine compounds are lithium phosphates of empirical formula $LiXPO_4$ where X=Mn, Fe, Co or Ni, or combinations thereof.

Examples of lithium transition-metal oxide, spinel compounds, and layered transition-metal oxides include lithium manganate, preferably $LiMn_2O_4$, lithium cobaltate, preferably $LiCoO_2$, lithium nickelate, preferably $LiNiO_2$, or mixtures of two or more of these oxides, or their mixed oxides thereof.

The active material may also contain mixtures of two or more of the substances described herein.

To increase the electrical conductivity, further compounds are included in the active material, preferably carbon-containing compounds, or carbon, preferably in the form of conductive carbon black or graphite. The carbon may also be introduced in the form of carbon nanotubes or graphene. Such additions are preferably in an amount of from 0.1 to 6 wt %, more preferably, from 1 to 3 wt %, based on the positive electrode's composition (excluding solvent) applied to the support.

Anode (The Negative Electrode)

As for selecting the active material for the negative electrode (also referred to as the active anode material), it is possible to use any active materials which are known in the art. According to one aspect of the invention, any suitable active material known in the art can be used for the negative electrode (the anode). The active anode material can be selected from the group consisting of lithium metal oxides, such as lithium titanium oxide, metal oxides (e.g., $Fe_2O_3$, ZnO, $ZnFe_2O_4$), carbon-containing materials, such as graphite (e.g., synthetic graphite, natural graphite), graphene, mesocarbon, doped carbon, hard carbon, soft carbon, fullerenes, mixtures of silicon and carbon, silicon, tin, materials which can be alloyed with lithium, and mixtures thereof. It is also possible to use niobium pentoxide, tin alloys, titanium dioxide, tin dioxide, and silicon as the active material for the anode (the negative electrode).

In one embodiment, the active anode material is a material which can be alloyed with lithium. This material may be metallic lithium, a lithium alloy, or an unlithiated or partially lithiated precursor thereof, from which a lithium alloy is produced on formation. Preferred materials which can be alloyed with lithium are lithium alloys selected from the group consisting of silicon-based, tin-based, and antimony-based alloys. Such alloys are described for example in the review article by W. J. Zhang, *Journal of Power Sources*, 196 (2011) 13-24.

Electrode Binder

The materials used for the positive or negative electrode, for example the active materials, are held together by one or more binders which hold these materials on the electrode and/or on the collector.

The binders can be selected from the group consisting of polyvinylidene fluoride (PVdF), polyvinylidene fluoride-hexafluoropropylene copolymer (PVdF-HFP), polyethylene oxide (PEO), polytetrafluoroethylene, polyacrylate, styrene-butadiene rubber, and carboxymethylcellulose (CMC), and mixtures and copolymers thereof. The styrene-butadiene rubber and optionally the carboxymethylcellulose and/or the further binders, such as PVdF, are preferably present in an amount of 0.5-8 wt %, based on the total amount of the active material used in the positive or negative electrode.

Separator

The electrochemical cell of the invention has a material which separates the positive electrode and the negative electrode from one another. This material is permeable for lithium ions, i.e., conducts lithium ions, but is a nonconductor for electrons. Materials of this kind used in lithium-ion batteries are also referred to as separators.

In one preferred embodiment, polymers are used as separators. In one embodiment, the polymers are selected from the group consisting of: polyesters, preferably polyethylene terephthalate; polyolefin, preferably polyethylene, polypropylene; polyacrylonitrile; polyvinylidene fluoride; polyvinylidene-hexafluoropropylene; polyetherimide; polyimide, polyethers; polyetherketone, or mixtures thereof. The separator has porosity, so that it is permeable to lithium ions. In a preferred embodiment, the separator consists of at least one polymer.

Electrolyte

As used herein, the term "electrolyte" refers to a liquid in which a conducting lithium salt is in solution. The liquid is preferably a solvent for the conducting salt. In that case the conducting Li salt is preferably in the form of an electrolyte solution.

Preferably, the solvents are chemically and electrochemically inert. Examples of suitable solvents include preferably organic solvents such as, ethylene carbonate, propylene carbonate, butylene carbonate, dimethyl carbonate, diethyl carbonate, ethyl methyl carbonate, sulfolanes, 2-methyltetrahydrofuran, and 1,3-dioxolane. Preferably, organic carbonates are used as the solvent.

In one aspect of the invention, ionic liquids can also be used as solvents. The ionic liquids contain exclusively ions. Examples of cations include those which can be in alkylated form, such as imidazolium, pyridinium, pyrrolidinium, guanidinium, uronium, thiuronium, piperidinium, morpholinium, sulfonium, ammonium, and phosphonium cations. Examples of anions which can be used include halide, tetrafluoroborate, trifluoroacetate, triflate, hexafluorophosphate, phosphinate, and tosylate anions.

Exemplary ionic liquids include the following: N-methyl-N-propylpiperidinium bis(trifluoromethylsulfonyl)imide, N-methyl-N-butylpyrrolidinium bis(trifluoromethylsulfonyl)imide, N-butyl-N-trimethylammonium bis(trifluoromethylsulfonyl)imide, triethylsulfonium bis(trifluoromethylsulfonyl)imide, and N,N-diethyl-N-methyl-N-(2-methoxyethyl)ammonium bis(trifluoromethylsulfonyl)imide.

Preference is given to using two or more of the liquids described above. Preferred conducting salts are lithium salts which have inert anions and which are preferably nontoxic. Suitable lithium salts are preferably lithium hexafluorophosphate ($LiPF_6$), or lithium tetrafluoroborate ($LiBF_4$), and mixtures of one or more of these salts. In one embodiment the separator here is wetted or impregnated with the lithium salt electrolyte.

Various objects, advantages and novel features of the present invention will become apparent from the following detailed description of one or more preferred embodiments when considered in conjunction with the accompanying examples.

In one aspect of the disclosure, the present invention is directed to a composite cathode.

The composite cathode of the invention includes a collector, an active cathode material, a binder, a solid inorganic lithium-ion conductor, and a liquid electrolyte, the solid inorganic lithium ion conductor in the composite cathode being present in a higher volume fraction and weight fraction than the liquid electrolyte. The coating of the collector is composed of the active cathode material, the binder, the solid inorganic lithium-ion conductor, and the liquid electrolyte, and is preferably porous and preferably homogeneous.

In one aspect, the solid inorganic lithium-ion conductors include crystalline, composite, and amorphous inorganic solid lithium-ion conductors. The crystalline lithium-ion conductors include in particular, perovskite-type lithium lanthanum titanates, NASICON-type, LiSICON-type and thio-LISICON-type Li-ion conductors, and also garnet-type Li-ion-conducting oxides. The composite lithium-ion conductors include, in particular, materials which contain oxides and mesoporous oxides. Solid inorganic lithium-ion conductors of this kind are described for example in the review article by Philippe Knauth "Inorganic Solid Li Ion Conductors: An Overview", *Solid State Ionics*, Volume 180, Issues 14-16, 25 Jun. 2009, pages 911-916. Also included in accordance with the invention are all solid lithium-ion conductors which are described in Cao C, Li Z-B, Wang X-L, Zhao X-B and Han W-Q (2014) "Recent Advances in Inorganic Solid Electrolytes for Lithium Batteries", *Frontiers in Energy Research,* 2:25. Also included, in particular, in accordance with the invention are the garnets described in EP 1723080 B1.

The composite electrode of the invention therefore has a composition which is predominantly a solid inorganic lithium-ion conductor that is employed as an inorganic solid-state electrolyte. Also present, as an auxiliary electrolyte, is a liquid electrolyte, in a lower weight fraction and volume fraction.

The inventors have recognized that by including the solid inorganic lithium-ion conductor in the composite cathode according to the present invention, it is possible to reduce the amount of liquid electrolyte in the composite cathode. As a result it is possible to reduce the total amount of liquid electrolyte included in a lithium-ion battery having the composite cathode. In this way, both the amount of solvents and the amount of conducting salt, especially $LiPF_6$, can be lowered, hence making it possible to reduce not only the risk of ignition of emergent liquids or gases but also reduce the health hazards posed by the production of hydrogen fluoride (HF) from an reaction of $LiPF_6$ with moisture.

In one preferred embodiment of the invention, the composite cathode has interconnected pores which contain the solid inorganic lithium-ion conductor and the liquid electrolyte. By arranging the solid inorganic lithium-ion conductor and the liquid electrolyte in interconnected pores, it is possible to lower the contact resistance between the particles of the solid inorganic lithium-ion conductor.

In one preferred embodiment of the invention, the composite cathode, based on the volume without the liquid electrolyte, possesses a porosity of 10% to 25% and the porosity is filled out with the liquid electrolyte to an extent of more than 90%, more preferably, more than 95%. Most preferably, it is completely filled out by the liquid electrolyte. By filling out the porosity with the liquid electrolyte to the most complete extent possible, it is possible to improve the contact resistance between the particles of the solid inorganic lithium-ion conductor.

In one preferred embodiment of the invention, the active cathode material and the solid inorganic lithium-ion conductor each consist of particles or secondary particles, where present, and the particles of the active cathode material possess a larger average particle size D50, preferably a 5 to 1000 times larger particle size D50, more preferably 10 to 100 times larger particle size D50, than the particles of the solid inorganic lithium-ion conductor. The measurements in this context are determined by scanning electron microscopy (SEM). A measurement technique of this kind is described for example in U.S. Pat. No. 5,872,358. By using particles or secondary particles of the solid inorganic lithium-ion conductor that possess a larger particle size D50 than that of the solid inorganic lithium-ion conductor, the energy density per unit volume of the composite cathode can be increased.

In one preferred embodiment, the active cathode material consists of secondary particles, and the particle size D50 of the secondary particles is more than 3 μm to 75 μm, preferably 5 μm to 35 μm. The measurement values are determined as described above.

In one preferred embodiment, the solid inorganic lithium-ion conductor consists of particles, and the particle size D50 of the particles is more than 0.05 μm to 5 μm, preferably 0.1 μm to 3 μm. The measurement values are determined as described above.

In one preferred embodiment, the solid inorganic lithium-ion conductor is present, at 10 to 50 wt %, preferably from 20 to 40 wt %, in the composite cathode in relation to the active cathode material.

In one preferred embodiment, the active cathode material is selected from the group consisting of lithium metal oxide, layered oxides, spinels, olivine compounds, silicate compounds, HE-NCM, and mixtures thereof. Especially preferred are $LiCoO_2$, NCM, NCA, olivine, OLO (layered-layered), HE-NCM, spinel, and mixtures thereof.

In one preferred embodiment, the solid inorganic lithium-ion conductor possesses a lithium-ion conductivity of at least $10^{-5}$ S/cm. The measurement values in this context are determined by the GITT (Galvanostatic Intermittent Titration Technique), as described for example in W. Weppner and R. A. Huggins, *J. Electrochem. Soc.,* 124, 1569-1578 (1977).

In one preferred embodiment, the solid inorganic lithium-ion conductor is selected from the group consisting of Perovskite, glass formers, Garnet, and mixtures thereof. Especially preferred are the Garnets described by EP 1723080 B1, on account of their particular electrochemical stability in the 3-5 V potential range of the cathode (positive electrode).

In one preferred embodiment, the binder is selected from the group which consists of polyvinylidene fluoride, copolymer of polyvinylidene fluoride and hexafluoropropylene, polyethylene oxide, copolymer of styrene and butadiene, cellulose, and mixtures thereof.

In one preferred embodiment, the liquid electrolyte contains organic carbonates and a conducting salt, preferably $LiPF_6$ or $LiPF_4$.

The thickness of the composite electrode is generally 5 μm to 250 μm, preferably 20 μm to 100 μm. The measurement values in this context are determined by optical methods, as specified in U.S. Pat. No. 4,008,523.

In another aspect of the disclosure, the present invention is directed to a lithium-ion battery which includes electrodes, a separator, and an electrolyte, where one of the electrodes is a composite cathode according to the present invention.

In another aspect of the disclosure, the present invention is directed to a method for producing the composite cathode of the invention. The method includes the following steps: combining at least an active cathode material, a binder in solution with a solvent, an inorganic solid lithium ion conductor, and preferably, an electrically conductive additive, into a homogeneous slurry; applying the slurry to a collector; stripping off the solvent under reduced pressure and/or elevated temperature, developing porosity in the slurry; adjusting the porosity, more particularly adjusting the volume of the porosity to 5% to 25%, by compressing and/or calendaring; filling up the free porosity of the composite cathode with a liquid electrolyte. This may be carried out by impregnation, optionally supported by reduced pressure and/or heat treatment.

The lithium-ion battery of the invention is suitable both for fixed and for portable applications. On account of the reduction in the amount of liquid electrolyte included, together with the reduced hazards to drivers/passengers, the lithium-ion battery of the invention is particularly suitable for use in motor vehicle applications.

EXAMPLES

Working Examples of a Cathode

Reference Cathode:
Dissolved at room temperature in 90 ml of NMP (from BASF) are 4.5 g of PVdF (Solef® 5130, from Solvay). Then, using a dissolver disk, 4.5 g of conductive carbon black (Super C65, from Timcal) are introduced. Lastly, 91.0 g of lithium nickel cobalt manganese oxide Li1Ni1/3Mn1/3Co1/3O2 (NMC111, from BASF, average particle diameter 11 μm) are incorporated by dispersion. This gives a black, homogeneous suspension, which with a semiautomatic film-drawing apparatus to an aluminum support foil (Hydro-Aluminum, 15 μm rolled aluminum foil, alloy 1085, hardness H18). Stripping off the NMP results in a composite cathode film. After calendering (compression) of the cathode film, the resulting porosity is 34% (based on volume), corresponding to a thickness of the cathode (without current collector) of 50 μm.

Inventive Cathode:
Dissolved at room temperature in 90 ml of NMP (from BASF) are 4.5 g of PVdF (Solef® 5130, from Solvay). Then, using a dissolver disk, 4.5 g of conductive carbon black (Super C65, from Timcal) are introduced. Lastly, 33.8 g of LLZ garnet (average particle diameter 1 μm) and 91.0 g of lithium nickel cobalt manganese oxide Li1Ni1/3Mn1/3Co1/3O2 (NMC111, from BASF, average particle diameter 11 μm) are incorporated by dispersion. This gives a black, homogeneous suspension, which with a semiautomatic film-drawing apparatus to an aluminum support foil (Hydro-Aluminum, 15 μm rolled aluminum foil, alloy 1085, hardness H18). Stripping off the NMP results in a composite cathode film. After calendering (compression) of the inventive cathode film with ceramic Li-ion conductor, the resulting porosity is 16% (based on volume), corresponding to a thickness of the cathode (without current collector) of 50 μm.

Working Examples of a Cell

For further cell construction, an anode with weight per unit area of 7.5 mg/cm$^2$ is used (1% CMC, 2% SBR, 1% Super C45, 1% SF66L), and was coated onto a 10 μm copper foil. The separator used is a 25 μm-thick polyolefin separator with the sequence PP/PE/PP. The liquid electrolyte used is a 1.1 M solution of LiPF$_6$ in EC:DEC (3:7 v/v), which penetrates into the free volume (pores) of the anode, the cathode, and the separator. From the respective electrode/separator assemblies, an Li-ion cell with 2.0 Ah nominal capacity is constructed in stacked design. In each case 20 reference cells with reference cathode and 20 inventive cells with inventive cathode are built.

Results of Long-Term Cycling
On long-term RT cycling (voltage range 2.8 V to 4.2 V (1 C, CCCV charging, 1 C CC discharging), behavior observed is identical to that of a batch of 5 reference cells and inventive cells:

After 500 cycles, 80% of the initial capacity (2 Ah) is achieved.

Safety Tests
10 cells each (reference and inventive) are subjected in the fully charged state (4.2 V) to a Sandia nail test ("penetration test", SANDIA REPORT, SAND2005-3123, Unlimited Release Printed August 2006 on page 18f; see http://prod.sandia.gov/techlib/access-control.cgi/2005/053123.pdf). The cells are punctured here with a nail 3 mm thick.

The results of the tests were evaluated on the basis of the EUCAR Hazard Levels in table 2 on page 15f. of the Sandia Report. Safety level 3 signifies emergence of less than 50 wt % of liquid electrolyte without inflammation or explosion. Safety level 4 corresponds to the previous safety level, but more than 50 wt % of liquid electrolyte emerges. In the case of safety level 5, additionally, there is inflammation of the cells.

TABLE 1

Results of the safety tests

| Result of safety test see table 1. Cell type | Observed cells Safety level 3. | Observed cells Safety level 4. | Observed cells Safety level 5. |
|---|---|---|---|
| Reference cell | 0 | 7 | 3 |
| Inventive cell | 10 | 0 | 0 |

Result: The inventive cells exhibit better safety behavior.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A composite cathode comprising:
   a collector,
   an active cathode material,
   a binder,
   a solid inorganic lithium ion conductor, and
   a liquid electrolyte,
   wherein the binder is selected from the group consisting of polyvinylidene fluoride, copolymer of polyvinylidene fluoride and hexafluoro-propylene, polyethylene oxide, copolymer of styrene and butadiene, cellulose, cellulose derivatives, and mixtures thereof,
   wherein the solid inorganic lithium ion conductor is selected from the group consisting of perovskite, glass formers, garnet, and mixtures thereof,
   wherein the solid inorganic lithium ion conductor is present in the composite cathode in a higher volume fraction and weight fraction than the liquid electrolyte,
   wherein the solid inorganic lithium ion conductor is present at 20 to 40 wt % in the composite cathode in relation to the active cathode material,
   wherein 0.1 to 6 wt % of carbon-containing compounds or carbon are included in the active cathode material, wherein the composite cathode has a porosity of 5% to 25%, based on a volume without the liquid electrolyte, and wherein the porosity is filled with the liquid electrolyte to an extent of more than 90%, and wherein the porosity is achieved by calendering.

2. The composite cathode according to claim 1, wherein the composite cathode has interconnected pores and the pores comprise the solid inorganic lithium ion conductor and the liquid electrolyte.

3. The composite cathode according to claim 1, wherein the porosity is filled with the liquid electrolyte to an extent of more than 95%.

4. The composite cathode according to claim 1, wherein the porosity is completely filled with the liquid electrolyte.

5. The composite cathode according to claim 1, wherein the active cathode material and the solid inorganic lithium ion conductor each comprise particles, wherein the particles of the active cathode material has a greater average particle size D50 than the particles of the solid inorganic lithium ion conductor.

6. The composite cathode according to claim 5, wherein the particles of the active cathode material has a 5 to 1000 times greater average particle size D50 than the particles of the solid inorganic lithium ion conductor.

7. The composite cathode according to claim 1, wherein the active cathode material comprises secondary particles having the particle size D50 of more than 3 μm to 75 μm.

8. The composite cathode according to claim 1, wherein the solid inorganic lithium ion conductor comprises particles having the particle size D50 of more than 0.05 μm to 5 μm.

9. The composite cathode according to claim 1, wherein the active cathode material is selected from the group consisting of lithium transition-metal oxides, layered oxides, spinels, olivine compounds, silicate compounds, high-energy lithium nickel cobalt manganese oxide, and mixtures thereof.

10. The composite cathode according to claim 1, wherein the solid inorganic lithium ion conductor has a lithium-ion conductivity of at least $10^{-5}$ S/cm.

11. The composite cathode according to claim 1, wherein the liquid electrolyte comprises organic carbonates and a conducting salt.

12. The composite cathode according to claim 11, wherein the conducting salt is $LiPF_6$ or $LiBF_4$.

13. A lithium ion battery comprising:
electrodes,
a separator, and
an electrolyte,
wherein one of the electrodes is a composite cathode according to claim 1.

14. A method for producing a composite cathode having a collector, an active cathode material, a binder, a solid inorganic lithium ion conductor, and a liquid electrolyte, wherein the binder is selected from the group consisting of polyvinylidene fluoride, copolymer of polyvinylidene fluoride and hexafluoro-propylene, polyethylene oxide, copolymer of styrene and butadiene, cellulose, cellulose derivatives, and mixtures thereof, the solid inorganic lithium ion conductor is selected from the group consisting of perovskite, glass formers, garnet, and mixtures thereof, the solid inorganic lithium ion conductor is present in the composite cathode in a higher volume fraction and weight fraction than the liquid electrolyte, the solid inorganic lithium ion conductor is present at 20 to 40 wt % in the composite cathode in relation to the active cathode material, 0.1 to 6 wt % of carbon-containing compounds or carbon are included in the active cathode material, and the composite cathode has a porosity of 5% to 25%, based on a volume without the liquid electrolyte, and wherein the porosity is filled with the liquid electrolyte to an extent of more than 90%, the method comprising the steps of:

combining at least the active cathode material, the binder in solution with a solvent, and the solid inorganic lithium ion conductor to form a homogeneous slurry;

applying the slurry to the collector;

stripping off the solvent under reduced pressure and/or elevated temperature, forming a porosity in the slurry;

adjusting the porosity by calendering; and filling up the porosity with the liquid electrolyte.

* * * * *